US011314439B2

(12) United States Patent
Hasegawa et al.

(10) Patent No.: US 11,314,439 B2
(45) Date of Patent: Apr. 26, 2022

(54) COPY FROM SOURCE MEDIUM TO TARGET MEDIUM

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Machida (JP); Shinsuke Mitsuma, Higashimurayama (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/598,979

(22) Filed: Oct. 10, 2019

(65) Prior Publication Data

US 2020/0042185 A1 Feb. 6, 2020

Related U.S. Application Data

(63) Continuation of application No. 15/402,076, filed on Jan. 9, 2017, now Pat. No. 10,545,698, which is a
(Continued)

(51) Int. Cl.
*G06F 3/06* (2006.01)
*H04L 67/1097* (2022.01)
(Continued)

(52) U.S. Cl.
CPC .............. *G06F 3/065* (2013.01); *G06F 3/061* (2013.01); *G06F 3/067* (2013.01); *G06F 3/0643* (2013.01);
(Continued)

(58) Field of Classification Search
CPC ...... G06F 3/065; G06F 3/0686; G06F 16/119; G06F 16/185; G06F 3/061; G06F 3/0643;
(Continued)

(56) References Cited

U.S. PATENT DOCUMENTS 6,496,826 B1 12/2002 Chowdhury et al.
7,710,681 B2 5/2010 Itagaki et al.
(Continued)

OTHER PUBLICATIONS

Corrected Notice of Allowance from U.S. Appl. No. 15/402,076, dated Dec. 11, 2019.
(Continued)

*Primary Examiner* — Cam Y T Truong
(74) *Attorney, Agent, or Firm* — Zilka-Kotab, P.C.

(57) ABSTRACT

A computer-implemented method, according to one embodiment, includes: estimating, by the computer system, a waiting time for copy target data to be transferred from the source medium. The waiting time includes an estimated time for locating and reading the copy target data from the source medium. The method also includes selecting, by the computer system, migration target data on the source medium based on whether migration of data to the target medium is expected to be finished within the waiting time. The selecting is based at least in part on comparing a size of the data and an allowable size calculated based on the waiting time and an estimated write transfer rate to the target medium. The method further includes migrating, by the computer system, the migration target data from the source medium to the target medium.

18 Claims, 12 Drawing Sheets

Related U.S. Application Data continuation of application No. 14/956,313, filed on Dec. 1, 2015, now Pat. No. 9,600,493.

(51) Int. Cl.
  *G06F 16/11* (2019.01)
  *G06F 16/185* (2019.01)

(52) U.S. Cl.
  CPC .......... *G06F 3/0656* (2013.01); *G06F 3/0683* (2013.01); *G06F 3/0686* (2013.01); *G06F 16/119* (2019.01); *G06F 16/185* (2019.01); *H04L 67/1097* (2013.01)

(58) Field of Classification Search
  CPC ...... G06F 3/0656; G06F 3/067; G06F 3/0683; G06F 3/0613; G06F 3/0646; G06F 3/0659; G06F 3/0685; H04L 67/1097
  See application file for complete search history.

(56) References Cited

U.S. PATENT DOCUMENTS

| | | | |
|---|---|---|---|
| 8,554,808 B2 | 10/2013 | Fukatani et al. | |
| 8,738,588 B2 | 5/2014 | Cannon et al. | |
| 8,775,720 B1 | 7/2014 | Meyer et al. | |
| 8,930,617 B2 | 1/2015 | Haustein et al. | |
| 9,025,261 B1* | 5/2015 | Hasegawa | G11B 15/442 360/8 |
| 9,087,549 B2 | 7/2015 | Katagiri et al. | |
| 9,600,493 B1 | 3/2017 | Hasegawa et al. | |
| 9,934,099 B1* | 4/2018 | Sharma | G06F 11/1464 |
| 10,545,698 B2 | 1/2020 | Hasegawa et al. | |
| 2010/0049834 A1 | 2/2010 | Maruyama et al. | |
| 2010/0293412 A1* | 11/2010 | Sakaguchi | G06F 11/0715 714/17 |
| 2014/0189196 A1 | 7/2014 | Kelkar et al. | |
| 2015/0022917 A1* | 1/2015 | Ashida | G06F 3/0656 360/51 |
| 2015/0055241 A1 | 2/2015 | Abe et al. | |
| 2015/0199147 A1* | 7/2015 | Goldberg | G06F 3/067 711/170 |
| 2016/0306547 A1 | 10/2016 | Perlstein et al. | |
| 2017/0153820 A1 | 6/2017 | Hasegawa et al. | |

OTHER PUBLICATIONS

List of IBM Patents Or Patent Applications Treated As Related.
Hasegawa et al., U.S. Appl. No. 14/956,313, filed Dec. 1, 2015.
Non-Final Office Action from U.S. Appl. No. 14/956,313, dated Jul. 29, 2016.
Notice of Allowance from U.S. Appl. No. 14/956,313, dated Nov. 14, 2016.
Hasegawa et al., U.S. Appl. No. 14/956,313, filed Jan. 9, 2017.
European Office Communication and Exam Report from European Application No. GB1619391.4, dated Apr. 26, 2017.
Examination Report from European Application No. GB1619391.4, dated May 24, 2017.
Non-Final Office Action from U.S. Appl. No. 15/402,076, dated Apr. 17, 2019.
Notice of Allowance from U.S. Appl. No. 15/402,076, dated Sep. 18, 2019.

* cited by examiner

```
<file>
<name>1111111111111111111-11111111111111111111-
1111111111-11111-1</name>
<length>185504</length>
<readonly>false</readonly>
<creationtime>20xx-xx-xxT06:45:19.429887274Z</creationtime>
<changetime>20xx-xx-xxT06:52:02.309109393Z</changetime>
<modifytime>20xx-xx-xxT06:52:02.246644691Z</modifytime>
<accesstime>20xx-xx-xxT06:45:19.429887274Z</accesstime>
<backuptime>20xx-xx-xxT06:45:19.429887274Z</backuptime>
<fileuid>7</fileuid>
<extendedattributes>
<xattr>
<key>xxx.yyyy.zzzz.path</key>
<value>/xxx/zzzz0/zzzz.docs-1.1.1-11.aaaaa.bbb</value>
</xattr>
</extendedattributes>
<extentinfo>
<extent>
<fileoffset>0</fileoffset>
<partition>b</partition>
<startblock>39</startblock>
<byteoffset>0</byteoffset>
<bytecount>185504</bytecount>
<startwrap>5</startwrap>
<startlpos>295332</startlpos>
<endwrap>5</endwrap>
<endlpos>393734</endlpos>
</extent>
</extentinfo>
</file>
```

EXTENT

PHYSICAL POSITION OF DATA EXTENT

COPY FROM SOURCE MEDIUM TO TARGET MEDIUM

BACKGROUND

The present invention, generally, relates to storage systems, more particularly, to methods and/or systems for copying from source media to target media in storage systems.

Hierarchical storage systems integrating with a tape storage system, in which a part of files is stored on tape media, have been developed. In the hierarchical storage systems, there may be provided a hierarchical storage management (HSM) functionality that performs several operations such as migration and recall between storage tiers. The HSM may move the file's data on a disk tier to back-end tape tier. When users or programs access the file, the HSM may automatically recall the file's data from the back-end tape tier.

One of the operations provided by the HSM in the hierarchical storage systems is reclamation, in which merely active data on a source medium is copied to another target medium so as to defragment active data on the medium. The reclamation process can be performed so that all active data stored on the source medium with low usage are moved to another tape medium in order to improve overall tape usage. For example, a particular implementation may automatically trigger the reclamation process when the ratio of the active data on the tape medium falls below a predetermined level (e.g. 35%).

Data may be scattered over the tape medium due to modification or deletion of files. Since tape drives may take some time to locate start position of each active data on the source medium due to their sequential nature, a reading time associated with reading a series of data (e.g., which may constitute a single file, a group of files, etc.) may be prolonged. Even though two drives are occupied during the reclamation process, the drive for the target medium may not always operate; there is a waiting time for the data to be transferred from the source medium, meaning that the drive resources are not fully utilized.

Such inefficiencies may also arise in inter-generation copies (or inter-generation migrations), in which data on an old generation tape medium is copied to a new generation tape medium. Typically, transfer rate for a new generation is higher than those for old generations. In this case, the write transfer rate for the new-generation medium may be adapted to the read transfer rate for the older-generation by a speed matching capability of the tape drives. Hence, the drive resources during the inter-generation copy are also not fully utilized.

Since the plurality of the drives are occupied during copy processes between media such as reclamation and inter-generation copy, other operations, e.g., such as migration and recall may be prevented: However, there exists a waiting time during which the capability of the drive is not effectively utilized.

In sharp contrast, methods, computer systems, storage systems and/or computer program products described in some of the various embodiments herein may be capable of effectively utilizing a waiting time during which the capability of the drive is not utilized for writing data transferred from a source medium to a target medium in a storage system, as will be described in further detail below.

SUMMARY

A computer-implemented method, according to one embodiment, is for copying data from a source medium to a target medium in a storage system by a computer system. The method includes: estimating, by the computer system, a waiting time for copy target data to be transferred from the source medium. The waiting time includes an estimated time for locating and reading the copy target data from the source medium. The method also includes selecting, by the computer system, migration target data on the source medium based on whether migration of data to the target medium is expected to be finished within the waiting time. The selecting is based at least in part on comparing a size of the data and an allowable size calculated based on the waiting time and an estimated write transfer rate to the target medium. The method further includes migrating, by the computer system, the migration target data from the source medium to the target medium.

A computer system, according to one embodiment, is configured to copy data from a source medium to a target medium. The computer system includes a processor and logic integrated with and/or executable by the processor, the logic being configured to perform the foregoing method.

A computer program product, according to one embodiment, is for copying data from a source medium to a target medium in a storage system. The computer program product includes a computer readable storage medium having program instructions embodied therewith, the program instructions readable and/or executable by a computer to cause the computer to perform the foregoing method.

Moreover, other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is an example of data structure of index data for a file, which includes information about physical positions of the file.

DETAILED DESCRIPTION

Figure 1:
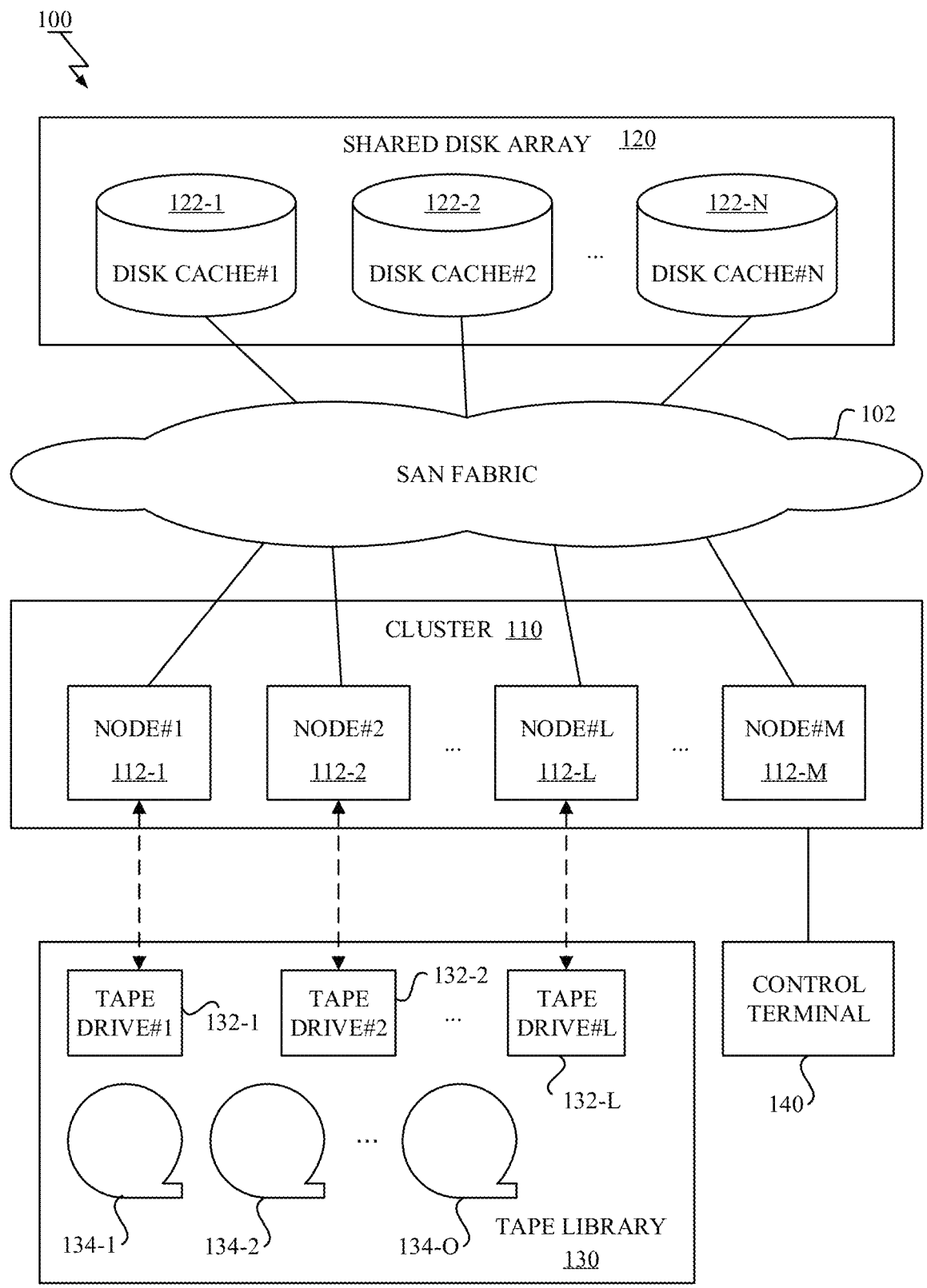
FIG. 1 is an overview of a hierarchical storage system according to an exemplary embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method may be for copying data from a source medium to a target medium in a storage system by a computer system, the storage system including a storage device, a first drive configured to access the source medium, and a second drive configured to access the target medium. The method includes: estimating, by the computer system, a waiting time for copy target data to be transferred from the source medium, selecting, by the computer system, migration target data of the storage device based on whether migration of data to the target medium is expected to be finished within the waiting time or not, migrating, by the computer system, the migration target data from the storage device to the target medium by the second drive while locating and/or reading the copy target data on the source medium by the first drive, and writing, by the computer system, the copy target data to the target medium by the second drive.

In another general embodiment, a computer system may be configured to copy data from a source medium to a target medium in a storage system, the storage system including a storage device, a first drive configured to access the source medium, and a second drive configured to access the target medium. The computer system includes: an estimator configured to estimate a waiting time for copy target data to be transferred from the source medium, a selector configured to select migration target data of the storage device based on whether migration of data to the target medium is expected to be finished within the waiting time or not, a copy module configured to read the copy target data from the source medium by the first drive and to write the copy target data to the target medium by the second drive, and a migration module configured to migrate the migration target data from the storage device to the target medium by the second drive while the copy module locating and/or reading the copy target data on the source medium.

In another general embodiment, a storage system may be configured to reclaim data from a source medium to a target medium. The storage system includes: a storage device for storing a plurality of data, a first drive for accessing the source medium storing reclamation target data, and a second drive for accessing the target medium. The storage system is also configured to: estimate, by the storage system, a waiting time for the reclamation target data to be transferred from the source medium, select, by the storage system, migration target data from among the plurality of the data based on whether migration of the data to the target medium is expected to be finished within the waiting time or not, migrate, by the storage system, the migration target data from the storage device to the target medium by the second drive while locating and/or reading the reclamation target data on the source medium by the first drive, and write, by the storage system, the reclamation target data to the target medium by the second drive.

In yet another general embodiment, a storage system may be configured to copy data from a source medium to a target medium, the target medium having a generation that is different from a generation of the source medium. The storage system includes: a storage device for storing a plurality of data, a first drive for accessing the source medium storing copy target data, and a second drive for accessing the target medium. Moreover, the storage system is configured to: estimate, by the storage system, a waiting time for the copy target data to be transferred from the source medium, select, by the storage system, migration target data from among the plurality of the data based on whether migration of the data to the target medium is expected to be finished within the waiting time or not, migrate, by the storage system, the migration target data from the storage device to the target medium by the second drive while locating and/or reading the copy target data on the source medium by the first drive to a cache or buffer, and write, by the storage system, the copy target data to the target medium by the second drive via the cache or buffer.

In another general embodiment, a computer program product may be for copying data from a source medium to a target medium in a storage system, the storage system including a storage device, a first drive for accessing the source medium, and a second drive for accessing the target medium. The computer program product includes a computer readable storage medium having program instructions embodied therewith, the program instructions readable and/or executable by a computer to cause the computer to perform a method which includes: estimating, by the computer, a waiting time for copy target data to be transferred from the source medium, selecting, by the computer, migration target data of the storage device based on whether migration of data to the target medium is expected to be finished within the waiting time or not, migrating, by the computer, the migration target data from the storage device to the target medium by the second drive while locating and/or reading the copy target data on the source medium by the first drive, and writing, by the computer, the copy target data to the target medium by the second drive.

Referring to series of FIGS. 1-3, it will be described a hierarchical storage system with disk and tape tiers according to an exemplary embodiment which is in no way intended to limit the invention. In some embodiments, the storage system may include a computer, e.g., according to any of the approaches described and/or suggested herein.

Referring specifically now to FIG. 1, an overview of the hierarchical storage system 100 is shown. The hierarchical storage system 100 includes a cluster 110 with one or more nodes 112-1~112-M. The cluster 110 provides a file system that allows for performing file operations to the hierarchical storage system 100.

As shown in FIG. 1, the hierarchical storage system 100 may include a shared disk array 120 that includes one or more disk caches 122-1~122-N, which are storage devices storing files. Each node 112 in the cluster 110 may be connected to the disk cache 122 in the shared disk array 120 via a Storage Area Network (SAN) fabric 102. The SAN fabric may include, but is not limited to, Fibre Channel (FC)-SAN based on a fiber channel network and/or Internet Protocol (IP)-SAN based on Transmission Control Protocol (TCP), IP network with Local Area Network (LAN) switches, etc.

The nodes 112 may share the disk caches 122. The node 112 can access to the disk cache 122 via the SAN fabric 102 and provide also indirect file access for other nodes that do not connect to the SAN fabric 102. Such file system distributed to the one or more nodes 112 in the cluster 110, to which plurality of nodes (may include client nodes) can access, is so called a clustered file system or a distributed parallel file system. The clustered file system can provide a global namespace, a striping functionality to stripe input and output over the nodes and an information lifecycle management (ILM) functionality.

The hierarchical storage system 100 may include further a tape library 130. The tape library 130 includes one or more tape drives 132-1~132-L and one or more tape media 134-1~134O. Any tape medium 134 can be a medium for either source or target of copy operations. Each node 112 in the cluster 110 may be connected to the tape library 130 via SAN fabric, FC Low Voltage Differential (LVD), Small Computer System Interface (SCSI), Serial Attached SCSI (SAS) cables, etc. Equipping the plurality of the tape drives 132-1~132-L enables the node 112 to access a set of the tape media 134 simultaneously. The tape drive 132 may be occupied by the node at a point in time and may be used alternately. According to an exemplary embodiment, which is in no way intended to limit the invention, the tape drives 132 may accept Linear Tape-Open (LTO) Ultrium 5 or later tape cartridges, which support LTFS, or other proprietary formats.

The tape library 130 is managed by a tape file system such as Liner Tape File System (LTFS) and integrated to the clustered file system so that at least part of data in the shared disk array 120 is stored on tape media 134 in the tape library 130. Files may migrate from the shared disk array 120 to the tape library 130 based on a predetermined migration policy.

The hierarchical storage system 100 may include further a control terminal 140. The control terminal 140 is a terminal device where an administrative user can operate to issue manual request and to specify settings of the hierarchical storage system. By using the control terminal 140, the administrative user can specify settings of a novel reclamation and/or inter-generation copy process according to the exemplary embodiment, which will be described in further detail below. The administrative user can also issue manual request and specify schedules or policies for other functionalities of the hierarchical storage system 100 such as standard migration, recall, reconciliation, file placement, file management, etc.

As shown in FIG. 1, in the describing embodiment, the nodes 112-1~112-M are described to be connected to the disk caches 122-1~122-N in the shared disk array 120 and the nodes 112-1~112-L are described to be connected to the tape drives 132-1~132-L in the tape library 130. However, the configuration of the hierarchical storage system 100 shown in FIG. 1 is only an example for typical storage system and is not intended to suggest any limitation.

For instance, in one embodiment, the shared disk array may be divided to one or more online storages and one or more nearline storages to construct a three or more tiered architecture. In another particular embodiment, the hierarchical storage system may include further a flash storage tier on top of the hierarchical storage system. In further other embodiment, the storage system may have merely one node, one disk cache and one tape drive to construct a hierarchical storage system. In further another embodiment, another type of a sequential access medium may be used as a storage medium for both source and target in place of or in addition to the tape medium.

Figure 2:
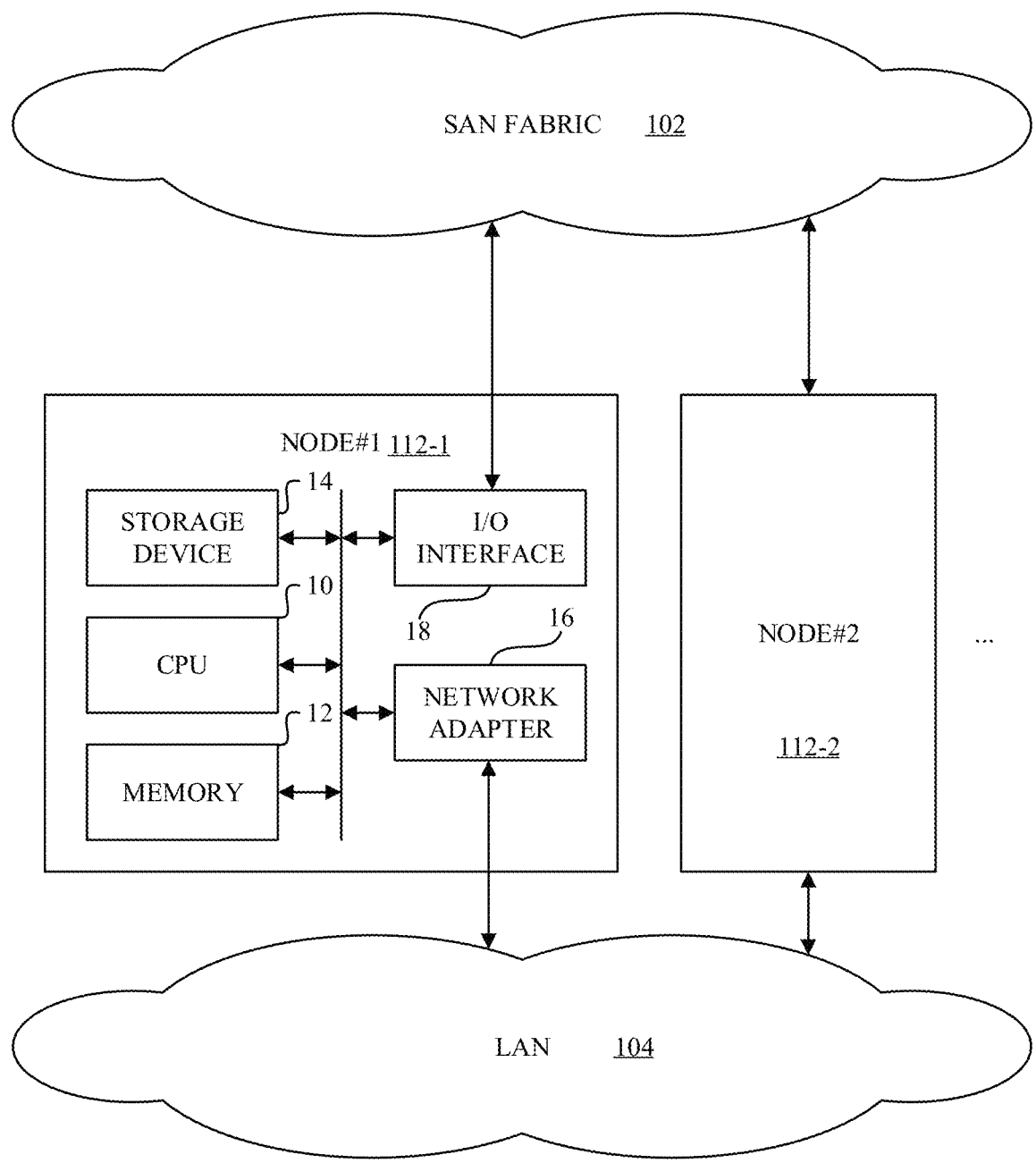
FIG. 2 is a node constituting a cluster of the hierarchical storage system according to the exemplary embodiment.

Referring now to FIG. 2, a schematic of an example of a node is shown. The node 112 is only one example of a suitable node and is not intended to suggest any limitation as to the scope of use and/or functionality of the various embodiments described and/or suggested herein. Regardless, the node 112 is capable of being implemented and/or performing any of the functionality set forth herein.

The node 112 is operational with numerous other general purpose or special purpose computing system environments or configurations. Examples of computing systems, environments, and/or configurations that may be suitable for use with the node 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, etc.

The node 112 may be described in the general context of computer system-executable instructions, such as program modules, being executed by a computer system. Generally, program modules may include routines, programs, objects, components, logic, data structures, etc., which may perform particular tasks or implement particular abstract data types.

As shown in FIG. 2, the node 112 is shown in the form of a general-purpose computing device. The components of the node 112 may include, but are not limited to, one or more processors (or processing units) 10 and a memory 12 operatively coupled to the processors 10 by a bus including a memory bus, a memory controller, a processor, a local bus using any of a variety of bus architectures, etc.

The node 112 typically includes a variety of computer system readable media. Such media may be any available media that is accessible by the node 112, and may include both volatile and/or non-volatile media, removable and/or non-removable media.

The memory 12 may include computer system readable media in the form of volatile memory, such as random access memory (RAM). The node 112 may further include other removable and/or non-removable, volatile and/or non-volatile computer system storage media. By way of example only, the storage device 14 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage device 14 may include at least one program product having a set (e.g., at least one) of program modules that are configured to carry out the functions of the embodiments described herein.

Program/utility, having a set (at least one) of program modules, may be stored in the storage device 14 by way of example, and not limitation, as well as an operating system, one or more application programs, other program modules, and program data. Each of the operating system, one or more application programs, other program modules, and program data and/or some combination thereof, may include an implementation of a networking environment. Program modules generally carry out the functions and/or methodologies of embodiments as described herein.

The node 112 may also communicate with one or more peripherals such as a keyboard, a pointing device, etc.; a display; one or more devices that enable a user to interact with the node 112; and/or any devices (e.g., network card, modem, etc.) that enable the node 112 to communicate with one or more other computing devices via SAN fabric 102. Such communication can occur via Input/Output (I/O) interfaces 18. Still yet, the node 112 can communicate with one or more networks such as a local area network (LAN) 104, a general wide area network (WAN), and/or a public network (e.g., the Internet) via the network adapter 16. As depicted, the network adapter 16 communicates with the other components of the node 112 via bus. It should be understood that although not shown, other hardware and/or software components could be used in conjunction with the node 112. Examples, include, but are not limited to: microcode, device drivers, redundant processing units, external disk drive arrays, RAID systems, tape drives, and data archival storage systems, etc. The node 112 may be interconnected with other node via a host channel adapter (HCA) such as InfiniBand™.

Hardware and/or software components of the tape library 130, the tape drives 132, the control terminal 140 may include, similar to the node 112 shown in FIG. 2, a processor, a memory, a read only memory, a network adapter, a I/O interface, and robotic mechanism, but not be shown in the drawings any more.

Figure 3:
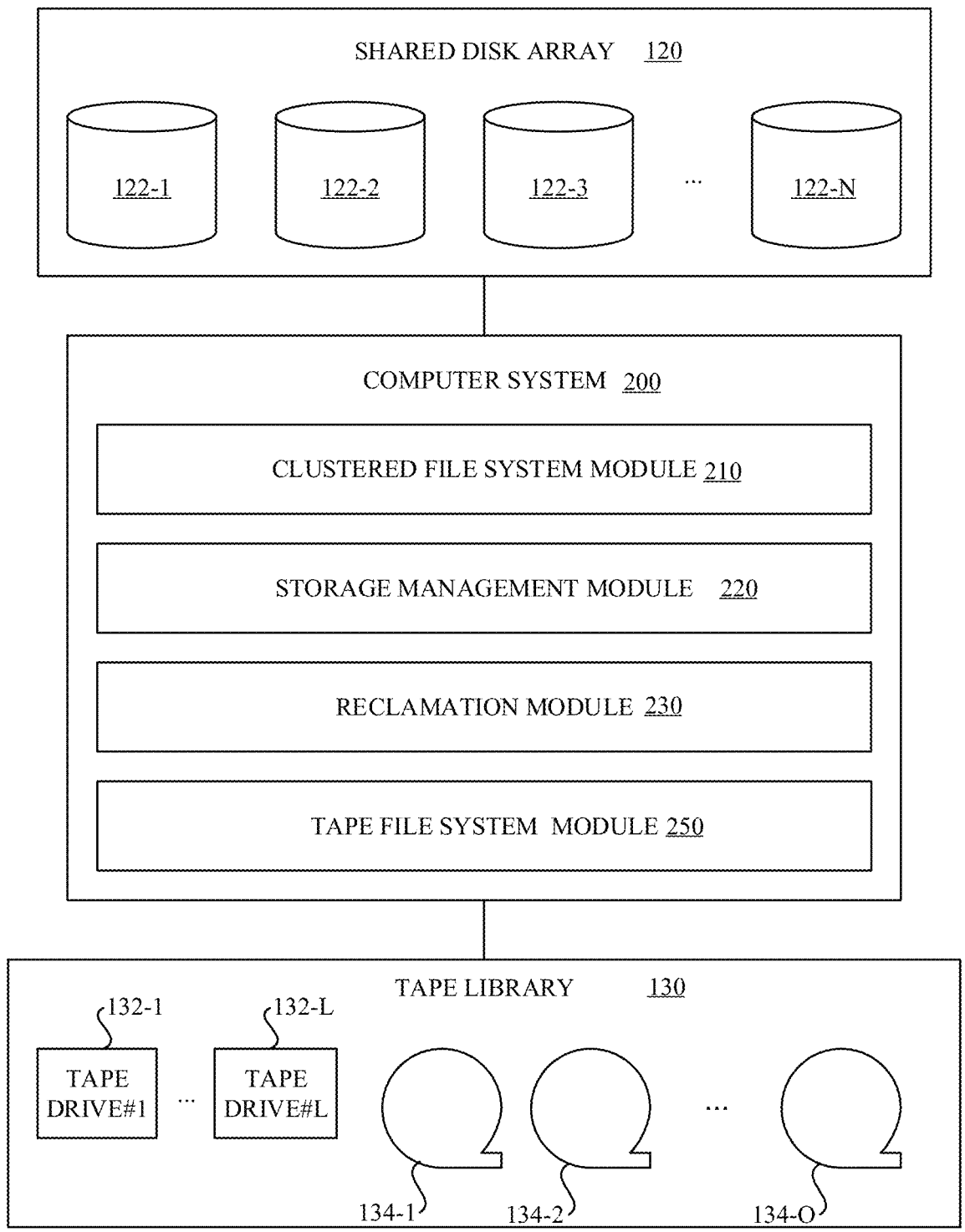
FIG. 3 is a block diagram of the hierarchical storage system according to the exemplary embodiment.

Referring now to FIG. 3, a block diagram of the hierarchical storage system 100 is illustrated. As shown in FIG. 3, the hierarchical storage system 100 includes a computer system 200 connected to the shared disk array 120 and the tape library 130. The computer system 200 may be composed of the nodes 112 in the cluster 110 shown in FIG. 1 and FIG. 2.

As shown in FIG. 3, the computer system 200 includes a clustered file system module 210; a storage management module 220; a reclamation module 230; and a tape file system module 250.

In some embodiments, computer system 200 may be configured to perform any one or more of the processes described herein. According to one example, which is in no way intended to limit the invention, computer system 200 may include memory having program instructions embodied therewith which are readable and/or executable by a computer (of the computer system) to cause the computer to perform any one or more of the processes corresponding to the components of reclamation module 230 in FIG. 4, as described below.

Referring still to FIG. 3, the clustered file system module 210 may be a software component that manages the clustered file system on the disk tier 120 in the hierarchical storage system 100. The tape file system module 250 may be a software component that allows for performing file operations to the tape media 134 and providing interface to manipulate files on the tape media 134 in the tape library 130. The tape media 134-1~134O in the tape library 130 may be accessed as subdirectories under a mount point of the tape library 130.

The storage management module 220 may be a software component that provides integration of the clustered file system managed by the clustered file system module 210 with the tape file system managed by the tape file system module 250. The storage management module 220 manages standard migration and recall activities in the hierarchical storage system 100.

The reclamation module 230 may be a software component that provides the novel reclamation function according to one or more embodiments described herein.

Migration is a process in which files are moved from the disk tier 120 to the tape media 134 on the tape tier 130. The migration process may have plurality of modes. In a first mode, the migration process leaves behind a small stub file on the disk tier 120, which points the file body migrated to the tape medium. The migration process in a second mode is so-called as a pre-migration, in which files are moved from the disk tier 120 to the tape media 134 on the tape tier 130 without replacing the file body with a stub file on the disk tier 120. According to the pre-migration mode, identical copies of the files are on both the disk and tape tiers 120, 130. Recall is a process in which the migrated files are moved from the tape media 134 back to the originating disk tier 120 if an accessed file does not exist on the disk tier 120.

The files newly created or overwritten to the hierarchical storage system 100 may initially be merely on the disk tier 120, thus the file state is initially "resident". The files may be migrated from the disk tier 120 to the tape tier 130 by running the migration process in first mode, after which the file is a stub on the disk and the identifiers of the tapes storing the copies are written to metadata. The file state of such file is referred as "migrated". The file may be recalled from the tape tier 130 by recall activities when an application attempts to read from the file. The file state of such file on both the disk and tape tiers is referred as "pre-migrated". Also the files may be pre-migrated to the tape tier 130 by running the migration process in second mode.

Novel Reclamation with Migration

A desired reclamation function, e.g., in which migration is performed during a spare time of reclamation process, is desired in some of the embodiments described herein.

Figure 4:
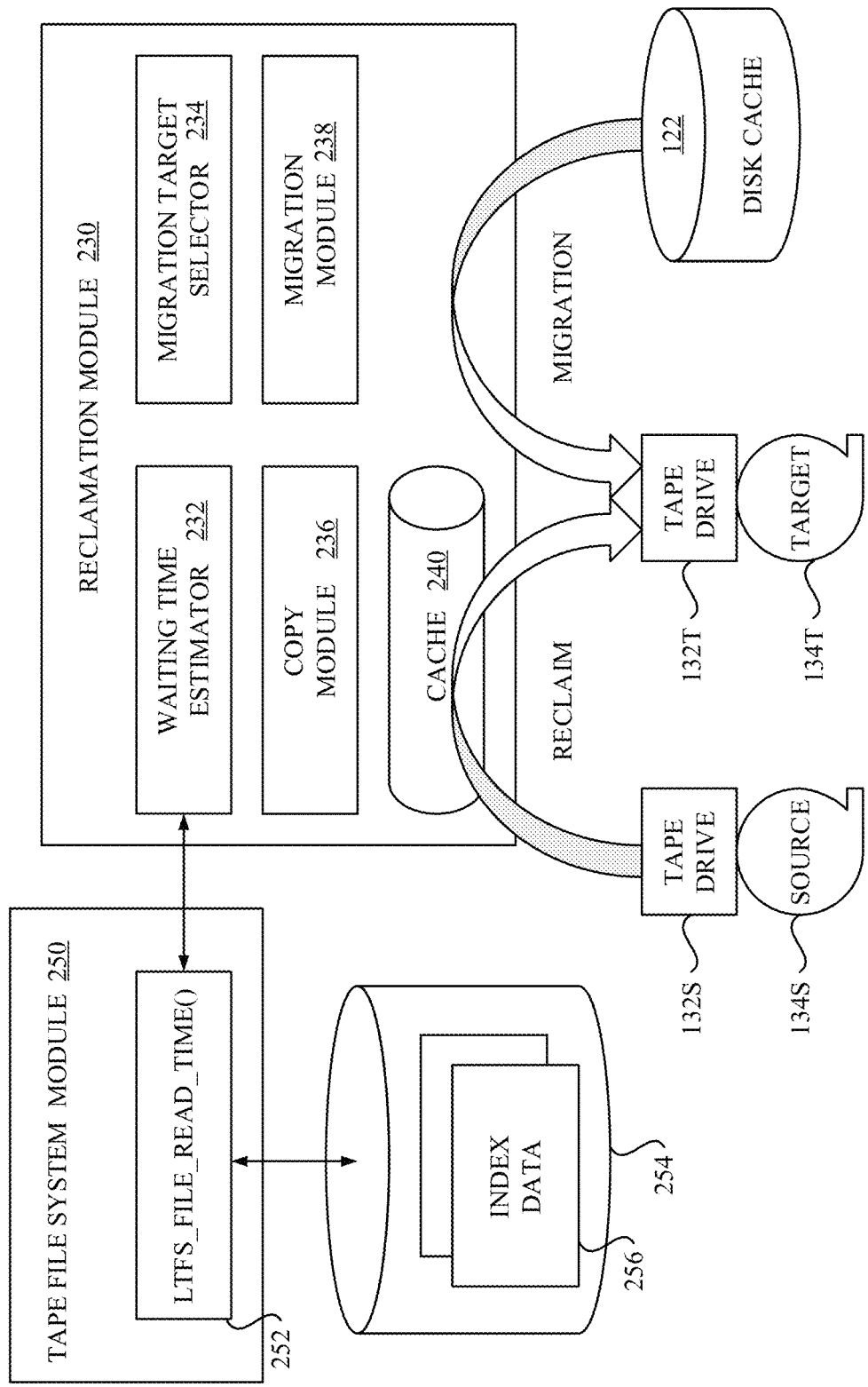
FIG. 4 is a block diagram of a reclamation module according one embodiment.

Referring to FIG. 4, a block diagram of the reclamation module according to the first embodiment is illustrated. In FIG. 4, a detailed block diagram of the reclamation module 230 is depicted with other components related to the novel reclamation function, which include the tape file system module 250, the plurality of the tape drive 132, the plurality of the tape media 134, and the disk cache 122.

The tape medium that stores target files of reclamation is referred to as a source medium 134S. The tape medium that is used as a target (or destination) of the reclamation is referred to as a target medium 134T. The tape drive 132 holds the source medium 134S is referred to as a source tape drive 132S and the tape drive 132 holds the target medium 134T is referred to as a target tape drive 132T.

Generally, the reclamation is a process in which merely active data on the source medium 134S is copied to the target medium 134T to defragment. Some particular implementations may automatically trigger the reclamation process when the ratio of the active data on the tape medium falls below a predetermined level. Since files stored on the disk tier 120 are often moved to the tape tier 130 using the plurality of the tape drives 132 at once, data are typically written to multiple tape media 134 evenly. Therefore, the multiple tape media 134 may have to be involved in the reclamation process simultaneously.

In this case, a lot of tape drives 132 are occupied for the reclamation. Alternatively, the reclamation may continue for a long time when many tape media 134 are processed by a single part of tape drive 132 in a one by one manner. Consequently, other operations such as the migrations and recalls may be prevented by drive occupation for the reclamation process.

Although at least two tape drives 132S, 132T are preferably occupied during the reclamation process, the target tape drive 132T may not always operate since the tape drives 132S may take some time to locate start position of each active data on the source medium 134S. There is a waiting time for the data to be transferred from the source medium 134S, during which the capability of the target tape drive 132T is not effectively utilized. Therefore, embodiments described and/or suggested herein may preferably be capable of effectively utilizing a waiting time during which the capability of the target tape drive 132T is not utilized for writing data transferred from the source medium 134S.

In one or more embodiments described herein, a novel reclamation function for reclaiming data from the source medium 134S to the target medium 134T, in which migration is performed during a spare time of the reclamation, may be described as being incorporated into the hierarchical storage system 100.

For this purpose, as shown in FIG. 4, the reclamation module 230 includes a waiting time estimator 232, a migration target selector 234, a copy module 236 and a migration module 238. In an exemplary embodiment, a cache 240 (or buffer) for temporarily storing data transferred from the source medium 134S is also utilized. The disk cache 122 may be a source storage device that stores a plurality of files as a target for migration which is performed during the spare time of the reclamation process.

The waiting time estimator 232 may be configured to estimate a waiting time for reclamation target data to be transferred from the source medium 134S. To estimate the waiting time, the waiting time estimator 232 may request read time information of a designated file to the tape file system module 250 through an API (application programming interface).

The tape file system module 250 includes a function (LTFS_FILE_READ_TIME( )) 252 to provide the read time information of the requested file. In a particular embodiment, ioctl system call may be used in UNIX® systems. In other particular embodiment, DeviceIoControl( ) function may be used in Windows® systems. The read time information may include a seeking time required for locating a beginning of the requested file ($T_{Start}$: fileStartReadTime) and a reading time required for reading the requested file from beginning to end after locating the beginning ($T_{Left}$: fileLeftReadTime). The function 252 calculates the read time information (fileStartReadTime, fileLeftReadTime) using physical positions of the requested file.

The physical positions of the file and a data structure where the tape file system module 250 obtains the physical positions of the file may vary in different embodiments. According to one embodiment, the tape medium 134 may include an index partition and a data partition, e.g., relative to a corresponding LTFS specification. The index partition contains index data such as information associated with allocation of files. The data partition contains all of content data and the index data. The index data may be read from the index partition of the tape medium 134 to a storage region 254, which may be an appropriate storage device such as the disk cache 122 or the memory 12, at the time of mounting of the tape medium 134. The latest index data 256 stored in the storage region 254 may be written back to the index partition of the tape medium 134 at the time of unmounting of the tape medium 134.

Figure 5:
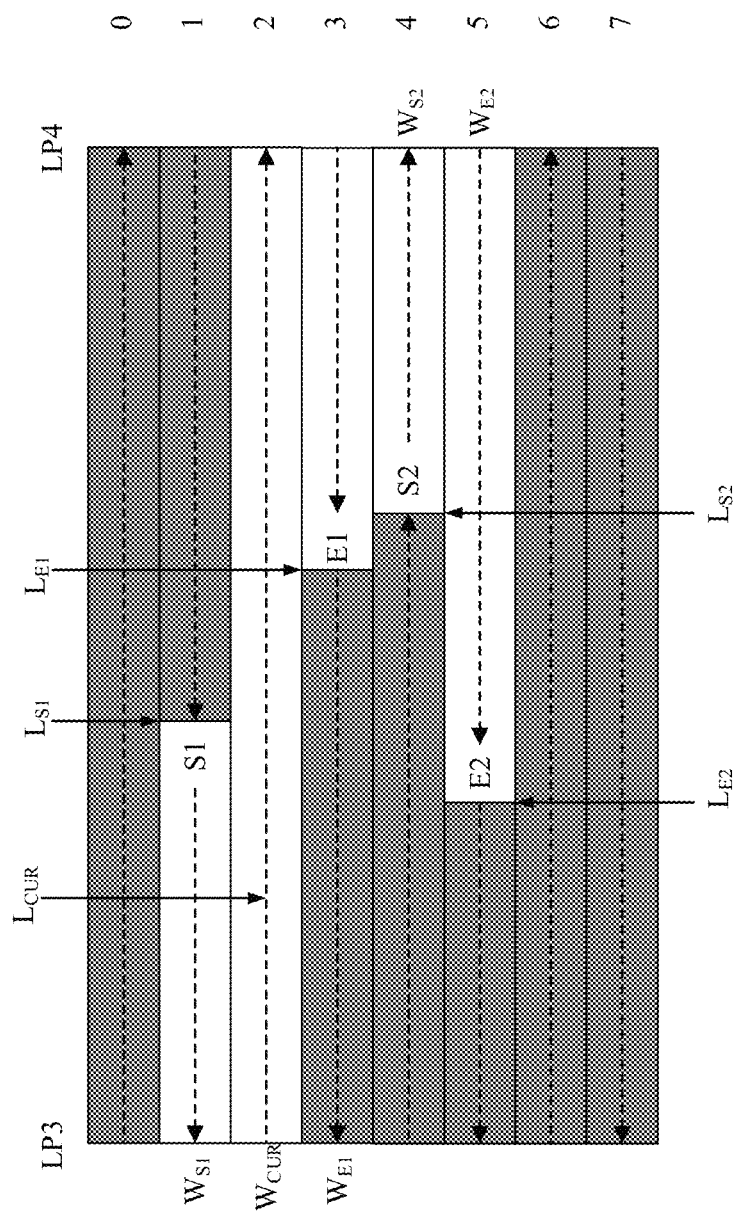
FIG. 5 is a physical position of a file on the tape medium.

Referring to FIG. 5, data arrangement and fragmentation of a file on a tape medium in accordance with LTFS format are described. The tape medium 134 has a partition with a number of wraps, each of which is a set of tracks in a single one-way pass between logical points that indicate a beginning and an end of a wrap (from LP3 to LP4 or from LP4 to LP3).

The LP3 and LP4 represent a beginning and an end of a user data region in a data storage area in a longitudinal direction of the tape medium, respectively. The beginning of the wrap corresponds to LP3 for forward wraps and LP4 for reverse wraps. The end of the wrap corresponds to LP4 for forward wraps and LP3 for reverse wraps. Note that wraps are described to be written from top to bottom for convenience and simplicity. However, in a particular embodiment, the wraps may be arranged in bidirectional serpentine layout.

In the LTFS, writing operations may proceed by making a pass over the tape medium in forward and backward repeatedly. In particular, recording physical position of the data on the tape medium is represented by a position in the longitudinal direction of the tape medium (hereinafter, this position may be referred as "LPOS") and a position in a lateral direction perpendicular to the longitudinal direction (hereinafter, this position may be referred as "WRAP").

Storing files on the tape medium 134, data for a signal file may often be fragmented on the tape medium. In FIG. 5, a white region represents a data piece of the file and a gray region represents other data or space region. As shown in FIG. 5, the file is fragmented into two data pieces. In LTFS, data pieces that constitute a file are called as "data extents"

The first data extent shown in FIG. 5 is recorded from position S1 to position E1 on the tape medium, and after another data is recorded, the second data extent is recorded from position S2 to position E2. Specifically, the first data extent is recorded from the position $L_{S1}$ to the LP3 in the start wrap $W_{S1}$, from the LP3 to the LP4 in the next wrap $W_{S1}+1$, and from the LP4 to the position $L_{E1}$ in the further next wrap $W_{S1}+2$, which corresponds to the end wrap $W_{E1}$. After another data is recorded, the second data extent is recorded from the position $L_{S2}$ to the LP4 in the start wrap $W_{S2}$ and from the LP4 to the position $L_{E2}$ in the end wrap $W_{E2}$. These physical positions of the file are recorded in the index data 256 in the storage region 254 or the tape medium 134.

Referring to FIG. 6, an example of data structure of index data for a file is shown. The tape file system module 250 may create an extent in the index data 256 when recording the data. The tape file system module 250 obtains current LPOS and WRAP from the tape drive 132 at the beginning and the end of writing data, and update the index data 242 stored in the cache 240 such that the LPOS and WRAP of the start and end positions of the data extent are written as an attribute of the file. In a particular embodiment, the LPOS and the WRAP representing a current position of a tape head on the tape medium 134 can be obtained from sense data or mode page data indicating an operating state of the tape drive 132 by using a SCSI command. The sense data and the mode page data may include positional information on the tape head, from which the WRAP and the LPOS of the tape head can be obtained.

In FIG. 6, the part expressed in boldface is the created extent, of which the underlined part is the information about the physical positions of the data extent. The information written to the extent includes an offset of a data extent within a file (fileoffset), an block number at which recording of the data extent is started (startblock), and the byte count (bytecount), and a start position (startwrap, startlpos) and an end position (endwrap, endlpos) of the data extent. The elements "startwrap", "startlpos", "endwrap" and "endlpos" correspond to $W_{Sn}$, $L_{Sn}$, $W_{En}$, and $L_{En}$ shown in FIG. 5, respectively.

Referring back to FIG. 4, on the basis of the physical position of the requested file, which includes the physical positions of the data extents constituting the requested file, the function 252 calculates the read time information (fileStartReadTime, fileLeftReadTime) based on the WRAP and the LPOS stored in the extent. In a particular embodiment, the seeking time (fileStartReadTime) after mounting the tape medium 134 and the reading time (fileLeftReadTime) after locating the start position can be calculated by using Equations 1-2 as follow:

$$fileStartReadTime = T_{WC}(0 \to W_{S1}) + |L_{S1} - lp3|/S_L \ldots \quad \text{Equation 1}$$

$$fileLeftReadTime = \sum_{n=0}^{N} \sum_{W=W_{Sn}}^{W_{En}-1} T_{WC}(W \to W+1) + \quad \text{Equation 2}$$

$$\sum_{n=0}^{N} f(W_{En}, W_{Sn}) \times (W_{En} - W_{Sn} - 1) \times (lp4 - lp3)/S_R +$$

$$\sum_{n=0}^{N} g(W_{En}, W_{Sn}) \times$$

$$(|L_{Sn} - l(W_{Sn})| + |L_{En} - l(W_{En} + 1)|)/S_R +$$

$$\sum_{n=0}^{N} (1 - g(W_{En}, W_{Sn})) \times |L_{En} - L_{Sn}|/S_R +$$

$$\sum_{n=0}^{N-1} (T_{WC}(W_{En} \to W_{Sn+1})) + |L_{En} - L_{Sn+1}|/S_L$$

where:

$S_L$: SPEED TO LOCATE (LOPS/s)

$S_R$: SPEED TO READ (LOPS/s)

$T_{WC}(W_p \to W_q)$: TIME FOR WRAP CHANGE FROM $W_p$ TO $W_q$

N: END OF EXTENT NUMBER $$f(W_{En}, W_{Sn}) = \begin{cases} 1 & \text{if}(W_{En} - W_{Sn}) > 1 \\ 0 & \text{else} \end{cases}$$

$$g(W_{En}, W_{Sn}) = \begin{cases} 0 & \text{if}(W_{En} = W_{Sn}) \\ 1 & \text{else} \end{cases}$$

$$l(W) = \begin{cases} lp3 & \text{if}(W = \text{odd wrap}) \\ lp4 & \text{else} \end{cases}$$

In Equations 1-2, lp3 and lp4 represent the longitudinal position (LPOS) of LP3 and LP4, respectively; $S_R$(LPOS/s) is reading speed; $S_L$(LPOS/s) is moving speed during seeking; $T_{WC}$(Wp→Wq) is a function that gives a time required to move from the wrap $W_p$ to the wrap $W_q$; l(W) is a function that gives a longitudinal position (LPOS) of the end or the beginning of the data at the wrap W; f($W_{En}$, $W_{Sn}$) is a function which returns 1 if the difference between $W_{En}$ and $W_{Sn}$ is greater than 1, and otherwise returns 0; and g($W_{En}$, $W_{Sn}$) is a function which returns 0 if $W_{En}$ equals to $W_{Sn}$, and otherwise returns 1; N represents end of extent number assigned to the last data extent.

In Equation 1, the first term gives a time required for changing wraps from an initial wrap position (that may be zero just after mounting) to the start wrap position of first data extent $W_{S1}$ during seeking. The second term gives a time required for locating the start longitudinal position $L_{S1}$ at the start wrap position $W_{S1}$ from an initial longitudinal position (that may be lp3 just after mounting). Accordingly, in some approaches, the physical position of the copy target data may include a longitudinal position and a wrap position of start and end positions of each data piece constituting the copy target data.

In Equation 2, the first term gives a time required for changing wraps during reading. The second term gives a time required for reading data from the beginning to the end of wraps fully occupied by the data. The third term gives a time required for reading remaining data having a length of less than one wrap from the beginning or the end of corresponding wraps. The fourth term gives a time required for reading data extent from the start position to the end position if the data extent is not reside over the plurality of wraps. If the file includes the plurality of the data extents, every term may be sum up for all data extents. The fifth term gives a time required for locating the start position of next data extents from the end position of the previous data extents.

If the tape medium is already mounted, the position of the tape head is sometimes in an intermediate point on the tape medium. If the reading of the file begins, already read data should be taken into account. If the request specifies a certain part of the file to be estimated, a length of the part among the file should be taken into account. In these cases, the function 252 inquires current positions to the tape head and calculates the read time information (fileStartReadTime, fileLeftReadTime) based on the physical position of the requested file stored in the extent ($W_{Sn}$, $L_{Sn}$, $W_{En}$, $L_{En}$), the current position of the tape head ($W_{CUR}$, $L_{CUR}$), an offset representing a size of the already read data (file offset) and a length for specifying a part to be estimated (length). The file offset and the length may be given as parameters of the request by the waiting time estimator 232.

For example, if the tape head is positioned at the intermediate point ($W_{CUR}$, $L_{CUR}$), the time taken to return from the point to S1 can be calculated based on Equation 1 by replacing the initial wrap position (0) by the current wrap position ($W_{CUR}$) and the initial longitudinal position (lp3) by the current longitudinal position ($L_{CUR}$). If some of data extent has been already read, the reading time can be calculated based on Equation 2 by excluding data extents having an offset less than the specified file offset from summation over data extents and by replacing a start position ($W_{S1}$ and $L_{S1}$) by the current position ($W_{CUR}$, $L_{CUR}$). If the length of the part to be estimated (length) is specified, summation may be taken over specific range of data extents, which corresponds to the specified length. If end of the part having the specified length is positioned at intermediate point of data extent, the ratio of the remaining data size within the data extent and the size of the data extent may be taken into consideration for calculating the reading time.

Referring back to FIG. 4, the waiting time estimator 232 estimates the waiting time by requesting the read time information to the function 252. In a particular embodiment, the waiting time can be calculated by simply summing the seeking time (fileStartReadTime) and the reading time (fileLeftReadTime) of the reclamation target data for given timing, which includes both of a time required for locating the reclamation target data and a time required for reading the reclamation target data. As shown in FIG. 5, data may not be transferred during a time for locating the start position of the data extents of the requested file. Thus, in other embodiments, the waiting time may include merely a time required for locating the reclamation target data by the source tape drive 132T.

The migration target selector 234 is configured to select migration target data on the disk tier 120 based on whether migration of data to the target medium 134 is expected to be finished within the waiting time estimated by the waiting time estimator 232. The selection of the migration target data is done by comparing a size of the file and an allowable size calculated from the waiting time and write transfer rate of the target medium 134T by the target tape drive 132T.

The copy module 236 is configured to read the reclamation target data from the source medium 134S by the source tape drive 132S and to write the reclamation target data to the target medium 134T by the target tape drive 132T. The copy module 236 may write the reclamation target data to the target medium 134T after the migration of the selected target data is completed. In a particular embodiment, files may be copied from the source medium 134S as the copy source to the target medium 134T as the copy destination in a one by one manner by using the CP or SCP command.

Instead of reading from the source medium 134 to the disk cache 122 so as to change the file state to "pre-migrated" state, the files are directly read from the source medium 134S. Thus, copy from the source medium 134S to the target medium 134T is conducted while leaving the file state to be "migrated" state.

The copy module 236 may read data from the source medium 134S into the cache 240 dedicated for data transfer in the reclamation, and write the read data to the target medium 134T. Note that the tape drive may not serve as an initiator as in the case of the extended copy for direct transfer between the drives. Two tape drives 132S and 132T are used together, and data copy is carried out between the source medium 134S and the target medium 134T in a one-to-one manner.

The migration module 238 is configured to migrate the migration target data from the disk tier 120 to the target medium 134T by the target tape drive 132T while reading (e.g., which may include locating and/or reading) the reclamation target data from the source medium 134S by the source tape drive 132S. In contrast to the reclamation where reading from the source medium 134S strongly affects performance, writing the migration target data to the target medium 134T controls speed of writing the target medium predominantly since the reading speed from the disk cache 122 is much faster than the writing speed to the target medium 134T.

The estimation of the waiting time by the waiting time estimator 232, the selection of the migration target data by the migration target selector 234 and the migration of the migration target data by the migration module 238 may be repeatedly performed before initiating a writing of each file or each group of files by the copy module 236.

The calculation of the waiting time and the selection of the migration target file will be described more detail with reference to FIGS. 7-8.

Figure 7:
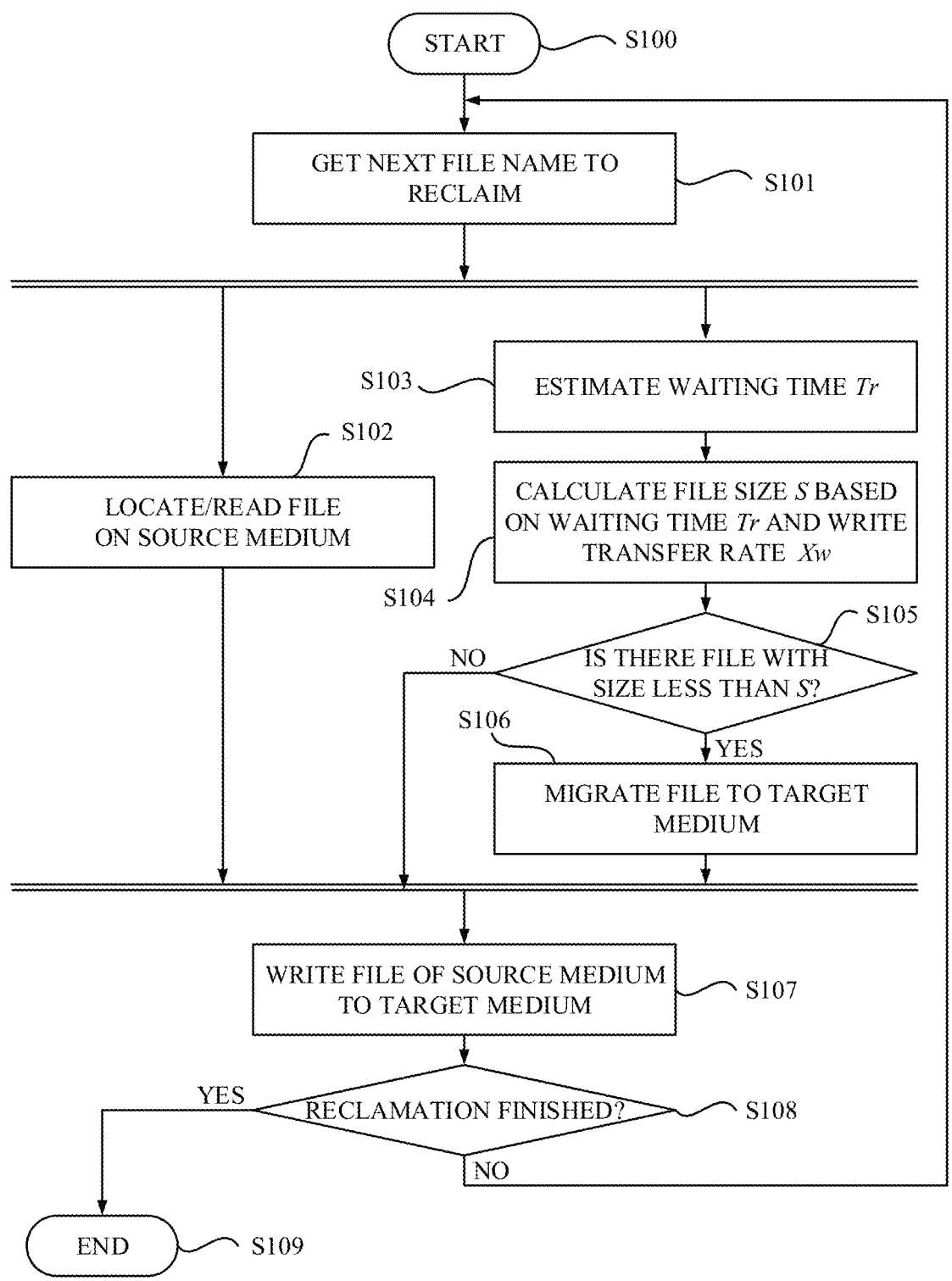
FIG. 7 is a flowchart depicting a process for reclaiming data from a source medium to a target medium in a storage system according to one embodiment.

Referring now to FIG. 7, a flowchart depicting a process for reclaiming data from the source medium 134S to the target medium 134T is shown. As shown in FIG. 7, process begins at step S100. Note that the process shown in FIG. 7 may be performed by the node 112 allocated to handle the novel reclamation process in response to receiving a request for the novel reclamation from users or determining that a condition that triggers the novel reclamation is met.

At step S101, the node 112 gets a name of next file to reclaim (hereinafter, a file to reclaim may be referred to as a reclamation target file) from a file list on the source medium 134S. At step S102, the node 112 starts locating the start position of the reclamation target file and reading the file on the source medium 134S by using the copy module 236.

In parallel to locating and reading the reclamation target file, at step S103, the node 112 estimates the waiting time Tr. At step S104, the node 112 calculates an allowable file size S that can be migrated to the target medium 134T within the waiting time based on the estimated waiting time Tr and the write transfer rate of the target medium Xw. The allowable file size S can be calculated using Equation 3:

$$S = Tr * Xw \qquad \text{Equation 3}$$

where: Xw represents the write transfer rate of the target medium 134T in Byte/sec.

At step S105, the node 112 determines whether there is an appropriate file with a size less than the calculated allowable size S (or an appropriate combination of files with a total size less than the calculated allowable size S) from among a plurality of files listed in a migration list. The migration list may include all files stored in the disk cache 122, whose file state is "resident" state. Alternatively, the migration list may include a group of resident files designated by the user. If the node 112 determines that there is the appropriate file (or the appropriate combination) in step S105 (YES), then the appropriate file (or the appropriate combination) is selected as the migration target data and the process proceeds to step S106.

Figure 8:
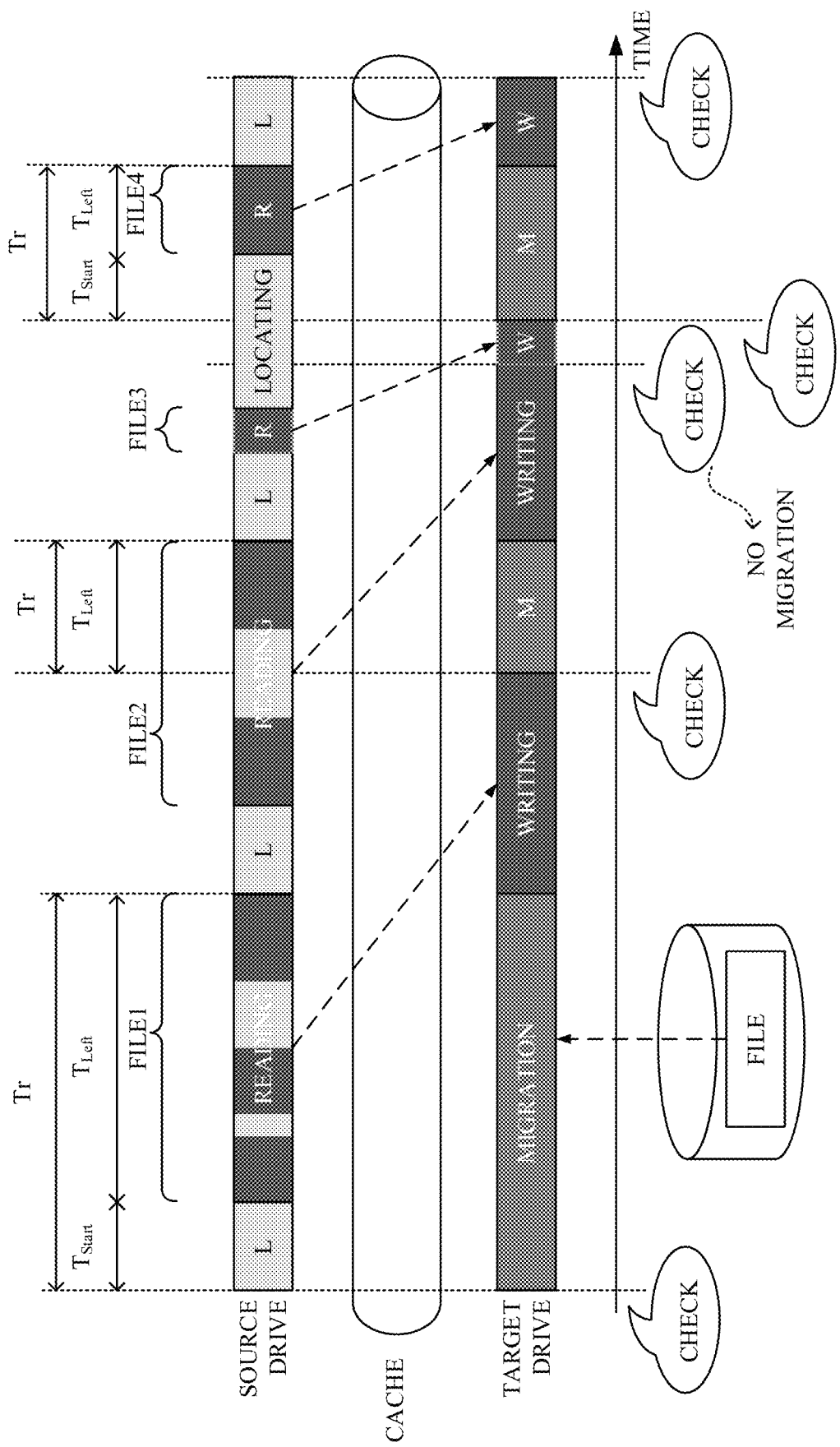
FIG. 8 is a timing chart during the reclamation process according to one embodiment.

FIG. 8 depicts a timing chart during the reclamation process. In FIG. 8, an upper band depicts read activities by the source tape drive 132S. Light gray regions and dark gray regions represent locating phases and reading phases, respectively. A lower band depicts write activities by the target tape drive 132T. Middle gray regions and dark gray regions represent migration phases and writing phases for the reclamation, respectively. Balloons represent timings in which the estimation of the waiting time and the selection of the migration target are performed for each file (step S103-S105).

For first target file (FILE 1), the waiting time Tr may be a sum of the seeking time ($T_{Start}$: fileStartReadTime) and the reading time ($T_{Left}$: fileLeftReadTime) of the first target file for given initial position just after mounting.

Referring back to FIG. 7, at step S106, the node 112 starts migrating the selected file to the target medium 134T. As shown in FIG. 8, the migration of the selected file is performed by the target tape drive 132T while locating and/or reading the reclamation target file from the source medium 134S by the source tape drive 132S. After completing the migration of the migration target file, the process proceeds to step S107. If the node 112 determines that there is no appropriate file in the step S105 (NO), also the process branches to step S107. At step S107, the node 112 starts writing the reclamation target file of the source medium 134S to the target medium 134T. In the describing embodiment, writing of the reclamation target file may be started after completing read of the reclamation target file.

At step S108, the node 112 determines whether the reclamation is finished or not. If the node 112 determines that the reclamation is not finished yet in step S108 (NO), then the process loops back to step S101 for next reclamation target file.

As shown in FIG. 8, with regard to second target file (FILE 2), at the timing where the node 112 completes the writing of the previous reclamation target file (FILE 1), the reading of the second target file (FILE 2) may be already started. In this situation, already read data of the second target file should be taken into account. In response to a request from the waiting time estimator 232, the function 252 may calculates the seeking time (fileStartReadTime) and the reading time (fileLeftReadTime) of a remaining part of the second target file for given current position and file offset. Since the reading of the second target file (FILE 2) is already started, the function 252 returns the seeking time (fileStartReadTime) as zero. Thus, in this case, the waiting time Tr may be equal to the reading time ($T_{Left}$: fileLeftReadTime) of remaining part of the second target file.

Regarding third target file (FILE 3), at the timing where the node 112 completes the writing of the previous reclamation target file (FILE 2), the reading of the third target file (FILE 3) may also be already completed. Therefore, the node 112 determines that there is no appropriate file in the step S105 (NO) and the process branches to step S107. At step S107, the node 112 starts writing the reclamation target file (FILE 3).

Regarding fourth target file (FILE 4), at the timing where the node 112 completes writing of the previous reclamation target file (FILE 3), the source tape drive 132S may be just in locating phase of the target file (FILE 4). In this case, the waiting time Tr may be a sum of remaining seeking time (fileStartReadTime) for given current position and the reading time (fileLeftReadTime) of the fourth target file.

Referring back to FIG. 7, if the node 112 determines that the reclamation is finished in step S108 (YES), then the process branches to step S109 and ends at step S109.

In the embodiment shown in FIG. 8, although the waiting time Tr is calculated by summing the seeking time (fileStartReadTime) and the reading time (fileLeftReadTime) of the reclamation target files for given condition, the spare time that corresponds to times required for locating the reclamation target files, which may include a time for locating beginning of each file and a time for locating start position of each data extent within the file, can be preferably estimated for migration.

By virtue of the novel reclamation function according to one or more of the embodiments described herein, even though the tape drive 132 is operated as a reclamation target, the data on the disk tier 122 can be migrated to the target medium 134 by the tape drive 132 within a spare time, during which the capability of the drive 132 is not utilized for writing the reclamation target data transferred from the source medium 134S. Thus, the drive resources can be effectively utilized at maximum. Occurrences of lowering the speed of the target medium or stopping the target medium due to waiting for data transfer can be reduced, thereby keeping writing speeds high.

Even in a small scale system, data can be prevented from being dispersed over a plurality of tape media and each tape medium can be utilized effectively. Also, users can perform reclamation and migration processes together at off-peak time during which the resources are relatively free or unused such as night.

Variants for Novel Reclamation with Migration

In the aforementioned embodiment shown in FIG. 8, the waiting time Tr is estimated by summing the seeking time (fileStartReadTime) and the reading time (fileLeftReadTime) for given condition. However, in other embodiments, the waiting time Tr can be calculated in different manners.

Figure 9:
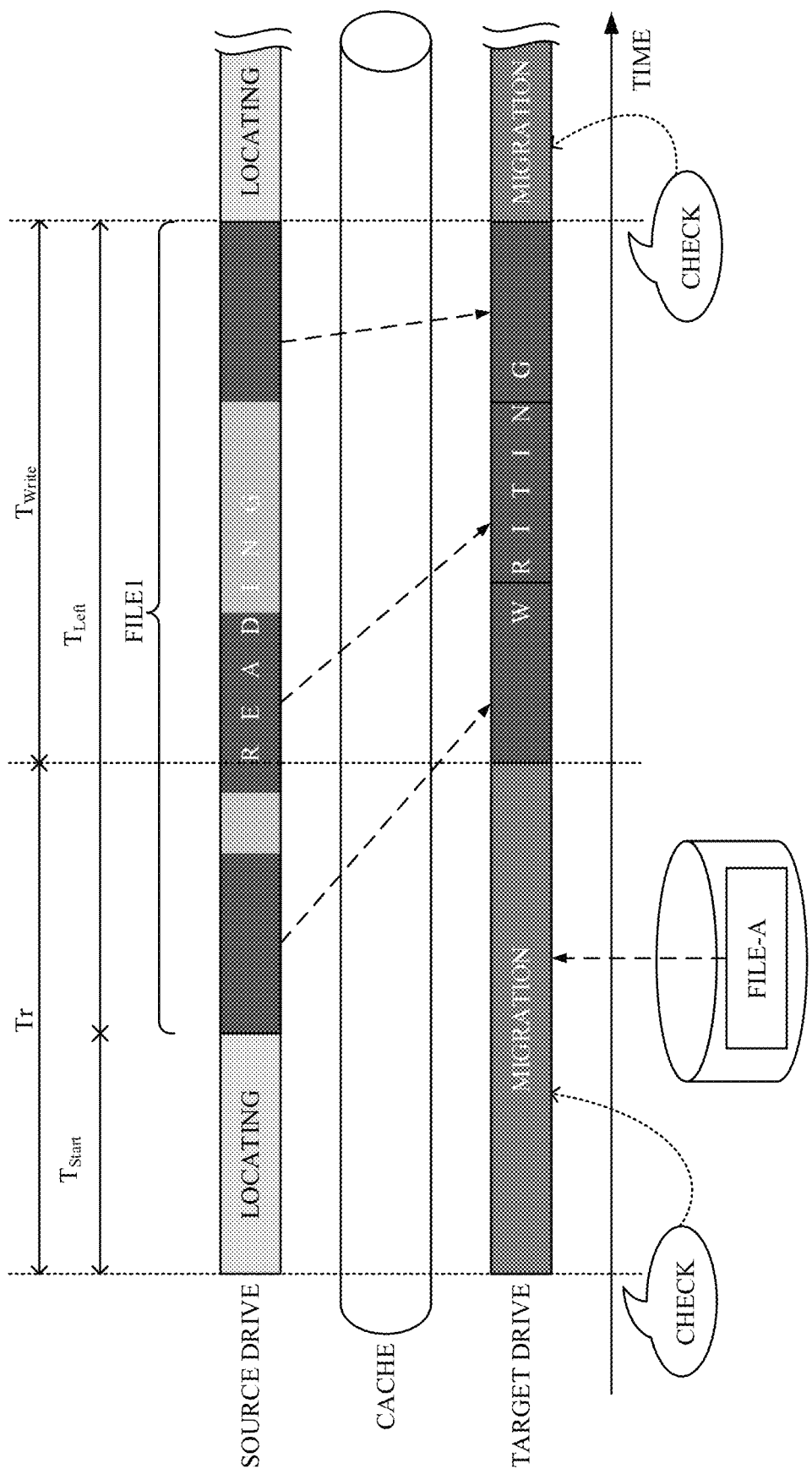
FIG. 9 is a timing chart during a reclamation process according to one embodiment.

Referring to FIG. 9 a timing chart during a reclamation process according to an exemplary embodiment. In the embodiment shown in FIG. 9, the waiting time Tr is estimated by subtracting the expected writing time ($T_{Writ}$) from a sum of the seeking time and the reading time ($Tr=T_{Start}+T_{Left}-T_{write}$). The expected writing time may be calculated from a file size of the target file and the write transfer rate ($T_{Write}$=file size/Xw). In this case, the waiting time Tr may correspond to a total seeking time for locating start position of the file and start position of each data extent of the file.

In other embodiment, merely seeking time ($T_{Start}$) may be simply used as the waiting time Tr. In this case, the spare time that corresponds to a time required for locating the beginning of the reclamation target files can be estimated for migration.

In the aforementioned embodiment shown in FIG. 7 and FIG. 8, the estimation of the waiting time Tr, the selection of the migration target data and the migration of the migration target data are repeatedly performed for each reclamation target file. However, in other embodiment, the waiting time Tr can be estimated for a group of reclamation target files and the estimation, the selection and the migration can be repeatedly performed for each group of reclamation target files. In this embodiment, a plurality of spare times for each reclamation target file in the group can be merged. Thus, relatively large file can be migrated during the spare time. Also in the aforementioned embodiment shown in FIG. 7 and FIG. 8, writing of the reclamation target file starts after completing read of the reclamation target file. However, in other embodiment, writing of the reclamation target file may starts before completing read of the reclamation target file.

Also note that both modes of the migration can be applicable to the novel reclamation process with migration. In one embodiment, migration during the novel reclamation process is performed in the first mode, in which a target file is moved from the disk tier 120 to the tape medium 134 of the tape tier 130 and a stub is leaved behind on the disk tier 120 in place of the target file. Thus, the file state of the migrated file becomes "migrated". In other embodiment, migration during the novel reclamation process is performed in the second mode, in which a target file is copied from the disk tier 120 to the tape medium 134 of the tape tier 130 such that identical copies of the target file exist on the disk tier 120 and the tape tier 130. Thus, the file state of the migrated file becomes "pre-migrated". It follows that in some of the embodiments described herein, the source medium and the target medium may include tape media, while the first and second drives includes tape drives. Moreover, the storage device as described herein may constitute an upper tier, while the tape drives constitute a lower tier, e.g., in a hierarchical storage system, e.g., see FIGS. 1-3.

In further other embodiments, the novel reclamation techniques can be used in combination with any known technologies such as a Recommended Access Order (RAO) capability in which a fastest order for data reading is provided by the tape drive.

Novel Inter-Generation Copy with Migration

In the aforementioned embodiments, the novel reclamation function for copying data from the source medium 134S to the target medium 134T has been described. Such inefficiencies may also arise in inter-generation copies, in which data on an old generation tape medium is copied to a new generation tape medium. Idea of the novel reclamation function can be applicable also to the inter-generation copy function. Hereinafter, a novel inter-generation copy function, in which migration is performed during a spare time of inter-generation copy process, according to an illustrative embodiment will be described in detail by referring series of FIGS. 10-12.

Figure 10:
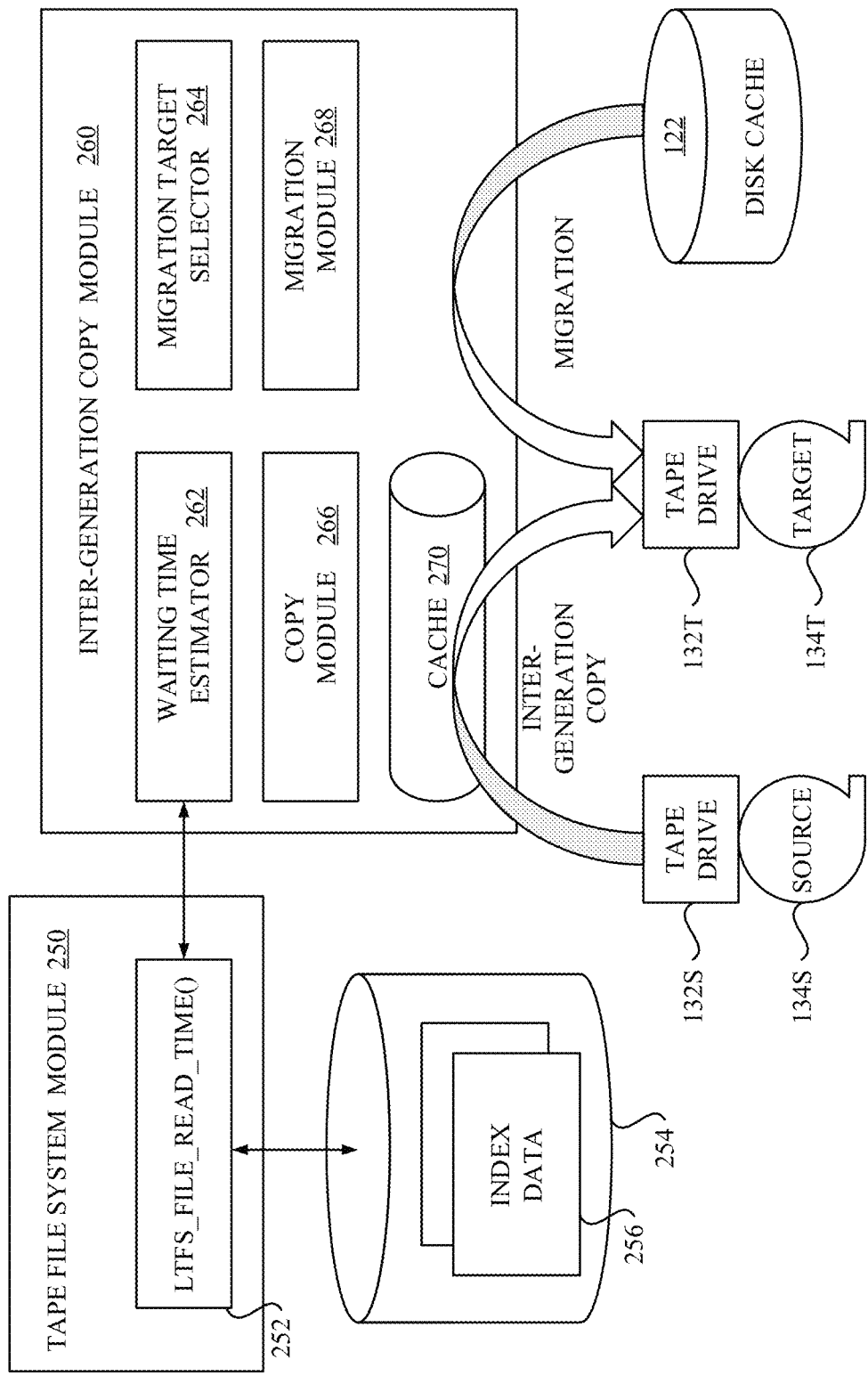
FIG. 10 is a block diagram of an inter-generation copy module according to one embodiment.

Referring to FIG. 10, a block diagram of an inter-generation copy module 260 according to an exemplary embodiment is illustrated. In FIG. 10, a detailed block diagram of the inter-generation copy module 260 is depicted with other components related to the novel inter-generation copy function.

Typically, transfer rate for a new generation is higher than those for old generations. In this case, the write transfer rate to the new-generation medium may be adapted to the read transfer rate for the older-generation by a speed matching capability of the tape drives.

For example, implementations of the hierarchical storage system may support one or more generations. Let assume that maximum transfer rate for new generation medium is three times faster than that for old generation medium. Due to this difference in the transfer rates, if an old generation medium is used as the copy source 134S (or a reclamation source tape) and a new generation medium is the copy target medium 134T (or a reclamation target tape), then the speed of writing data to the new generation medium will be one-third or less of the specification value, which is a hindrance to full utilization of maximum transfer rate for the new generation medium.

In one or more embodiments described herein, the novel inter-generation copy function for copying data from the source medium 134S to the target medium 134T, in which migration is performed during a spare time of the inter-generation copy, may be incorporated into the hierarchical storage system 100.

As shown in FIG. 10, the inter-generation copy module 260 includes a waiting time estimator 262, a migration target selector 264, a copy module 266 and a migration module 268 and a cache 270 (or buffer) for temporarily storing data transferred from the source medium 134S.

Similar to the novel reclamation process according to the first embodiment, the waiting time estimator 262 is configured to estimate a waiting time for the copy target data to be transferred from the source medium 134S by requesting the read time information of a file or a group of files to the tape file system module 250 through API. In the second embodiment, the waiting time may include a time required for accumulating predetermined amount of read data into the cache 270 by the source tape drive 132S.

According to an example, which is in no way intended to limit the invention, the maximum read transfer rate for the old generation medium may be one third of maximum write transfer rate for the new generation. Accordingly, the amount of the accumulation may be adjusted such that two thirds of data writing to the new generation target medium 134T are allocated to the migration from the disk cache 122 and one third of the data writing is used for the inter-generation copy. The amount of the accumulation may also be adjusted to have a size more than maximum file size so as to accommodate a plurality of files in the cache 270.

In a particular embodiment, the time required for accumulating the predetermined amount of data can be calculated based on the physical position of the copy target data on the source medium 134S. In this embodiment, fragmented files on the source medium 134S can be defragmented during the inter-generation copy. Alternatively, in other embodiment, the accumulation time may be calculated simply based on read transfer rate for the source medium 134S.

The migration target selector 264 is configured to select migration target data on the disk tier 120 based on whether migration of data to the target medium 134 is expected to be finished within the waiting time. The copy module 266 is configured to read the copy target data from the source medium 134S by the source tape drive 132S and to write the copy target data to the target medium 134T by the target tape drive 132T via the cache 270 dedicated for data transfer in the inter-generation copy. Note that maximum read transfer rate for the source medium 134S by the source tape drive 132S may be slower than maximum write transfer rate for the target medium 134T by the target tape drive 132T.

The migration module 268 is configured to migrate the migration target data from the disk tier 120 to the target medium 134T by the target tape drive 132T while reading the copy target data from the source medium 134S by the source tape drive 132S.

The estimation of the waiting time by the waiting time estimator 262, the selection of the migration target data by the migration target selector 264 and the migration of the migration target data by the migration module 268 may be repeatedly performed in response to detecting that the amount of the data accumulated in the cache 270 falls below a predetermined level as a result of writing by the copy module 266.

The calculation of the waiting time and the selection of the migration target file will be described more detail with referring to the series of FIGS. 11-12.

Figure 11:
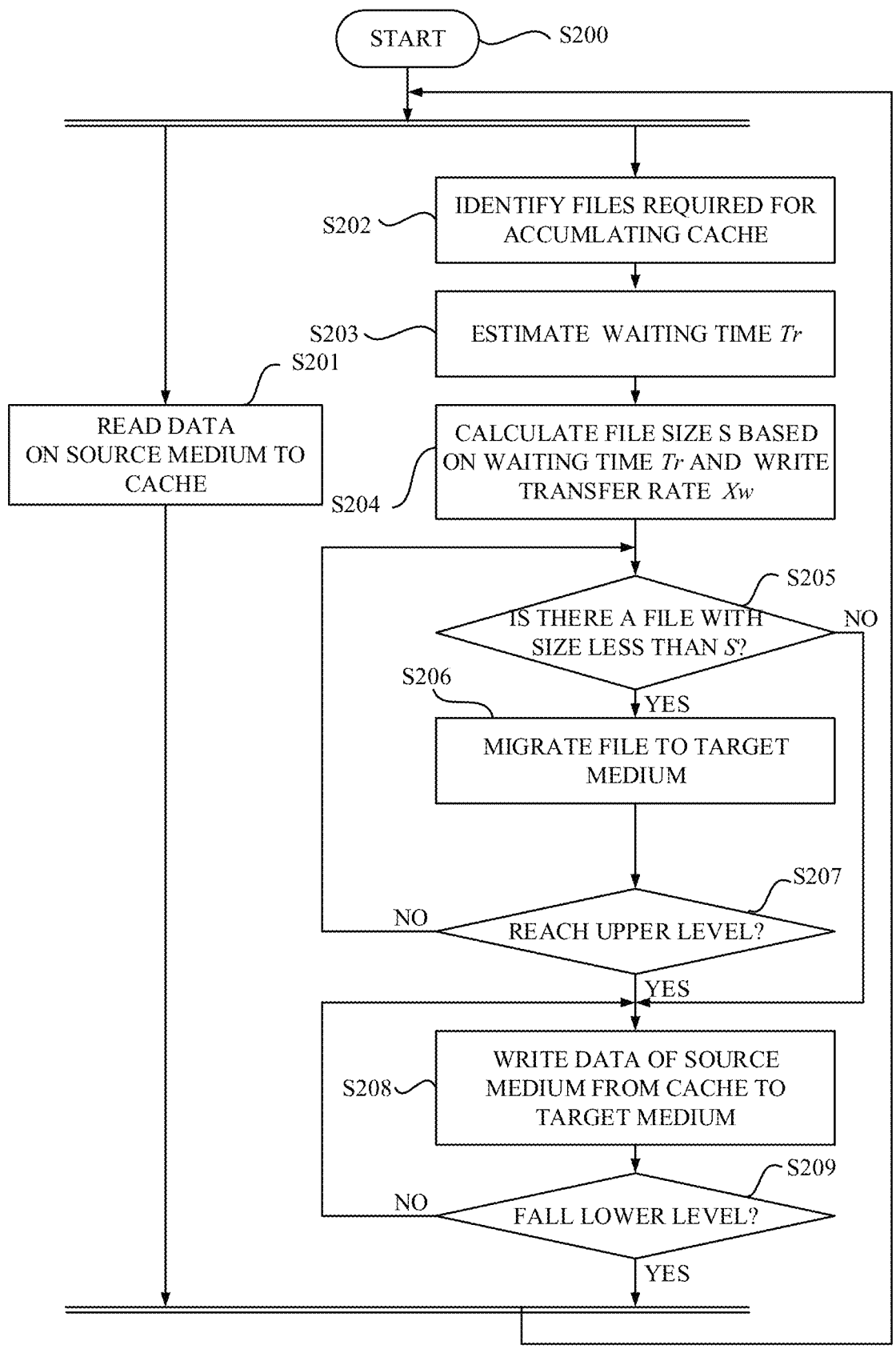
FIG. 11 is a flowchart depicting a process for copying data from a source medium to a target medium having different generation from the source medium in a storage system according to one embodiment.

Referring now to FIG. 11, a flowchart depicting a process for copying data from the source medium 134S to the target medium 134T having different generations is shown. As shown in FIG. 11, process begins at step S200. Note that the process shown in FIG. 11 may be performed by the node 112 allocated to handle the novel inter-generation copy process in response to receiving a request from users or detecting that a condition to trigger is met.

At step S201, the node 112 starts reading the copy target data on the source medium 134S by using the copy module 266. In parallel to reading the copy target data, at step S202, the node 112 identifies files required for accumulating the predetermined amount in the cache 270 from a file list on the source medium 134S. At step S203, the node 112 estimates the waiting time Tr based on the identified files.

Figure 12:
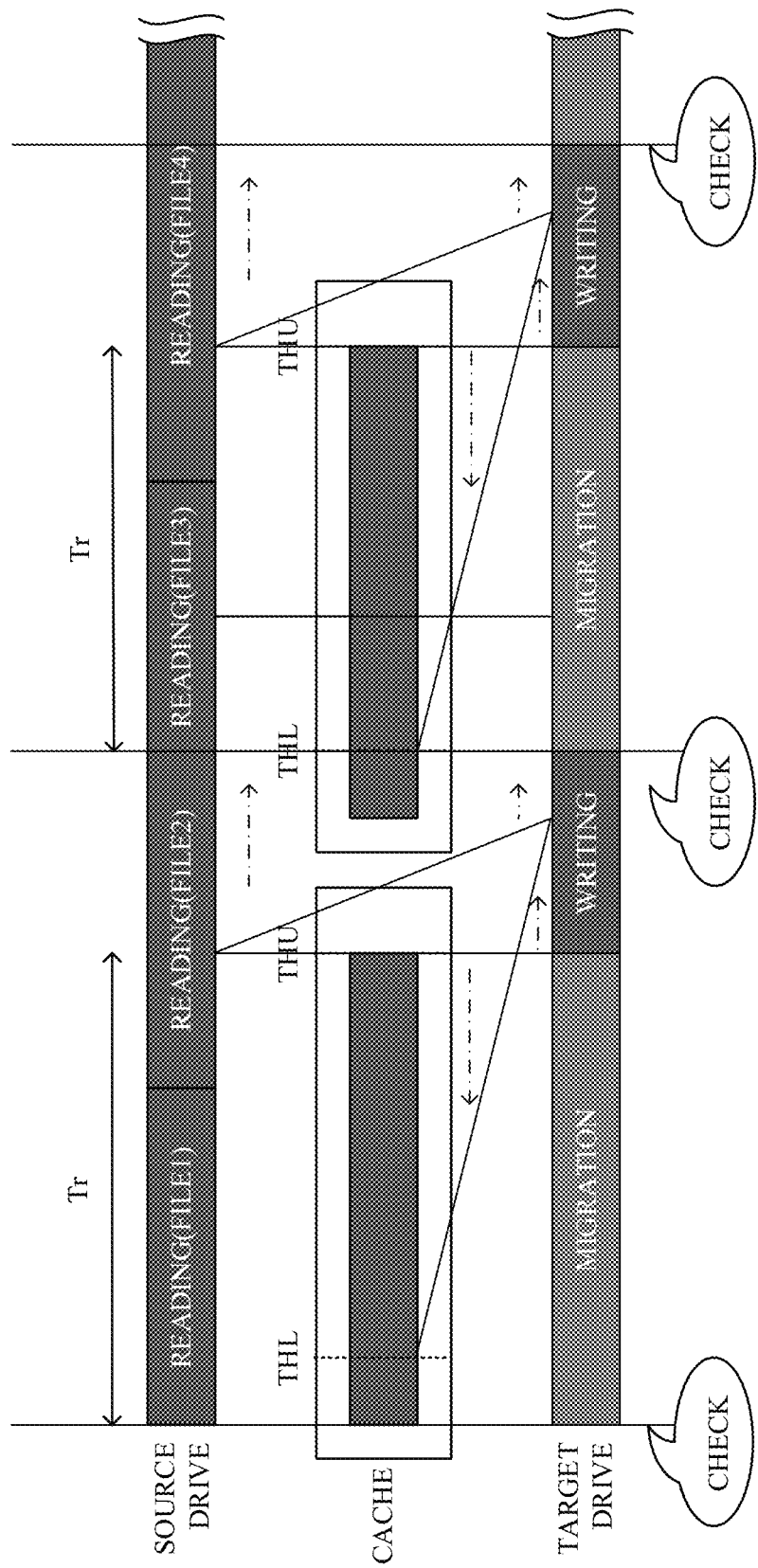
FIG. 12 is a timing chart during inter-generation copy process according to one embodiment.

FIG. 12 depicts a timing chart during inter-generation copy process according to an illustrative embodiment. Regarding to state of the cache 270, a middle bar represents the amount of data in the cache 270. Level THU represents an upper threshold for initiating write of the copy target data. Level THL represents a lower threshold for restarting migration. In the step S202, one or more files required for accumulating the predetermined amount is identified.

In an example shown in FIG. 12, for first time, two files (including FILE 1 and FILE 2) are identified. The waiting time estimator 262 requests the read time information of the first file and a part of the second file to the function 252. The length of the part may be designated as request parameter such that total file size of the first file and the part of the second file is equal to the predetermined amount (=THU−0).

At step S204, the node 112 calculates allowable file size S that can be migrated to the target medium 134T within the estimated waiting time based on the waiting time Tr and the write transfer rate of the target medium Xw. At step S205, the node 112 determines whether there is an appropriate file with a size less than the calculated allowable size S or an appropriate combination of files with a total size less than the calculated allowable size S from among a plurality of files listed in the migration list.

If the node 112 determines that there is the appropriate file or combination in step S205 (YES), then the appropriate file or the appropriate combination is/are selected as the migration target data and the process proceeds to step S206. At step S206, the node 112 starts migrating the selected file to the target medium 134T. As shown in FIG. 12, the migration of the selected file is performed by the target tape drive 132T while reading the copy target data from the source medium 134S by the source tape drive 132S. After initiating the migrating of the migration target file, the process proceeds to step S207. If the node 112 determines that there is no file in the step S205 (NO), the process branches to step S208.

At step S207, the node 112 determines whether the amount of the data accumulated in the cache 270 reaches upper level THU or not. If the node 112 determines that the amount of the data accumulated in the cache 270 does not reach the upper level THU in step S207 (NO), the process loops back to step S205. The node 112 waits for cache level to reach the upper level THU. If the node 112 determines that the amount reaches upper level THU, then the process proceeds to step S208.

At step S208, the node 112 starts writing data of source medium 134S from the cache 270 to the target medium 134T by the target tape drive 132T. At step S209, the node 112 determines whether the amount of the data accumulated in the cache 270 falls below the lower level (THL) or not. If the node 112 determines that the amount of the data accumulated in the cache 270 does not fall the lower level THL in the step S209 (NO), the process loops back to step S208. The node 112 waits for the cache level to fall below the lower level (THL). If the node 112 determines that the cache level falls below the lower level (THL) in step the S209 (YES), then the process loops back to step S201 for subsequent data.

In the example shown in FIG. 12, for second time, also two files (e.g., including FILE 3 and FILE 4) are identified at step S202. The waiting time estimator 262 requests the read time information of the third file and a part of the fourth file to the function 252. The length of the part may be designated such that total file size of the third file and the part of the fourth file is equal to the remaining amount.

In a particular embodiment, a unit of writing the data of the source medium 134S to the target medium 134T may be a file or plurality of files. In this embodiment, if a last file stored in the cache 270 is not ready for writing at the timing where node 112 completes the writing of previous one, inter-generation copy may be terminated at the file boundary and the writing of the last file may be conducted after next migration. In this case, accumulation time may be calculated by subtracting already read data of the last file.

Although not shown in FIG. 11, if the node 112 determines that the inter-generation copy is finished, then the process ends.

As shown in FIG. 12, it may be assumed that maximum write transfer rate for the new generation is 'q' times faster than that for old generation medium, thus (q−1)/q of data writing to the new generation target medium 134T may be allocated to the migration from the disk cache 122, while 1/q of the data writing is used for the inter-generation copy.

By virtue of the novel inter-generation function according to one or more embodiments described herein, even though the tape drive 132 is used as a copy target, the data on the disk tier 122 may be migrated to the target medium 134 by the tape drive 132 within an spare time during which the capability of the drive 132 is not utilized for writing the copy target data transferred from the source medium 134S. The spare time may correspond to a waiting time due to speed difference between the source medium 134S and the target medium 134T. Thus, the drive resources can be effectively utilized at an improved efficiency. Occurrences of lowering the speed of the target medium or stopping the target medium due to waiting for data transfer can be reduced, thereby keeping writing speeds high.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for copying data from a source medium to a target medium in a storage system by a computer system, the method comprising:
estimating, by the computer system, a waiting time for copy target data to be transferred from the source medium, wherein the waiting time includes an estimated time for locating and reading the copy target data from the source medium;
selecting, by the computer system, migration target data from a storage device based on whether migration of the migration target data to the target medium is expected to be finished within the waiting time, wherein the selecting is based at least in part on comparing a size of the migration target data and an allowable size calculated based on the waiting time and an estimated write transfer rate to the target medium; and
migrating, by the computer system, the selected migration target data from the storage device to the target medium during the waiting time, wherein the migration target data is migrated from the storage device to the target medium while the copy target data is being read from the source medium.

2. The method of claim 1, wherein the copy target data is a target of reclamation, wherein the waiting time includes a time required for locating and/or reading the copy target data from the source medium based on a physical position of the copy target data on the source medium.

3. The method of claim 2, wherein the physical position of the copy target data includes a longitudinal position and a wrap position of start and end positions of each data piece constituting the copy target data on a magnetic recording tape.

4. The method of claim 2, wherein the copy target data is a group of files, wherein the estimating, the selecting and the migrating are repeatedly performed for each file before initiating a writing of each file by a second drive configured to access the target medium.

5. The method of claim 1, wherein the copy target data is a target of an inter-generation copy, wherein the waiting time includes a time required for accumulating a predetermined amount of read data into a cache or buffer by a first drive configured to access the source medium.

6. The method of claim 5, wherein the time required for accumulating is calculated based on a physical position of the copy target data on the source medium, the physical position of the copy target data including a longitudinal position and a wrap position of start and end positions of the copy target data.

7. The method of claim 5, wherein the estimating, the selecting and the migrating are repeatedly performed in response to detecting that the predetermined amount of the read data accumulated in the cache or buffer falls below a predetermined level as a result of the migrating.

8. The method of claim 5, wherein maximum read transfer rate of the source medium by the first drive is slower than maximum write transfer rate of the target medium by a second drive configured to access the second drive.

9. The method of claim 1, wherein the source medium and the target medium are tape media.

10. A computer system configured to copy data from a source medium to a target medium, the target medium having a generation that is different from a generation of the source medium, the computer system comprising:
   a processor and logic integrated and executable by the processor, the logic being configured to:
   estimate, by the processor, a waiting time for copy target data on a source medium to be transferred from the source medium to a target medium, wherein the waiting time includes an estimated time for locating and reading the copy target data from the source medium;
   select, by the processor, migration target data from a storage device based on whether migration of the migration target data to the target medium is expected to be finished within the waiting time, wherein the selecting is based at least in part on comparing a size of the migration target data and an allowable size calculated based on the waiting time and an estimated write transfer rate to the target medium; and
   migrate, by the processor, the selected migration target data from the storage device to the target medium during the waiting time, wherein the migration target data is migrated from the storage device to the target medium while the copy target data is being read from the source medium.

11. The computer system of claim 10, wherein the waiting time includes a time required for accumulating a predetermined amount of read data into a cache or buffer from the source medium.

12. The computer system of claim 11, wherein the estimation of the waiting time, the selection of the migration target data and the migration of the migration target data are repeatedly performed in response to detecting that the predetermined amount of the read data accumulated in the cache or buffer falls below a predetermined level as a result of writing the copy target data.

13. A computer program product for copying data from a source medium to a target medium, the computer program product comprising a computer readable storage medium having program instructions embodied therewith, the program instructions readable and/or executable by a computer to cause the computer to perform a method comprising:
   estimating, by the computer, a waiting time for copy target data to be transferred from the source medium, wherein the waiting time includes an estimated time for locating and reading the copy target data from the source medium;
   selecting, by the computer, migration target data on a storage device based on whether migration of the migration target data to the target medium is expected to be finished within the waiting time, wherein the selecting is based at least in part on comparing a size of the migration target data and an allowable size calculated based on the waiting time and an estimated write transfer rate to the target medium; and
   migrating, by the computer, the selected migration target data from the storage device to the target medium during the waiting time, wherein the migration target data is migrated from the storage device to the target medium while the copy target data is being read from the source medium.

14. The computer program product of claim 13, wherein the copy target data is a target of reclamation, wherein the waiting time includes a time required for locating and/or reading the copy target data from the source medium based on a physical position of the copy target data on the source medium.

15. The computer program product of claim 14, wherein the physical position of the copy target data includes a longitudinal position and a wrap position of start and end positions of each data piece constituting the copy target data on a magnetic recording tape.

16. The computer program product of claim 14, wherein the copy target data is a group of files, wherein the estimating, the selecting and the migrating are repeatedly performed for each the before initiating a writing of each the by a second drive configured to access the target medium.

17. The computer program product of claim 13, wherein the copy target data is a target of an inter-generation copy, wherein the waiting time includes a time required for accumulating predetermined amount of read data into a cache or buffer by a first drive configured to access the source medium.

18. The computer program product of claim 13, wherein the source medium and the target medium are tape media.

* * * * *